L. E. SLAUSON.
TRACTOR WHEEL.
APPLICATION FILED OCT. 16, 1918.

1,393,707.

Patented Oct. 11, 1921.

Witnesses
Arthur C. Wright
Geo. L. Lawrence

Inventor
Louis E. Slauson
By Wm. Belt
Attorney.

UNITED STATES PATENT OFFICE.

LOUIS E. SLAUSON, OF MOLINE, ILLINOIS, ASSIGNOR TO GRID-IRON-GRIP COMPANY, OF ROCK ISLAND, ILLINOIS.

TRACTOR-WHEEL.

1,393,707.

Specification of Letters Patent.

Patented Oct. 11, 1921.

Application filed October 16, 1918. Serial No. 258,341.

*To all whom it may concern:*

Be it known that I, LOUIS E. SLAUSON, a citizen of the United States, residing at Moline, in the county of Rock Island, and State of Illinois, have invented certain new and useful Improvements in Tractor-Wheels, of which the following is a specification.

My invention relates to traction wheels and consists in an improved tread shoe and in its application to the traction wheel.

One object of my invention is the usual one present in auxiliary tread wheels of providing a large flat track for the support of the wheel proper. I desire to provide a simple device which may be attached to and removed from various types of wheels even though the latter were not originally designed to be equipped with auxiliary tread shoes.

A further object is to attach my tread shoes to the wheel so that as they are placed successively on the ground they will present their full ground engaging surface to the ground avoiding an angular or end-wise contact of the shoe with the ground. This results in less compacting of loose earth and in a smoother progression of the wheel. It also avoids an undue strain on the shoe and enables the same to be made lighter and accordingly more economically than if the shoe engaged the ground one end first and then, pivoting or that end moved into horizontal position with the advancement of the wheel. Also, when the shoe is lifted from the ground it is, at first, raised vertically, thereby avoiding plowing up the surface or scraping toward the wheel.

Referring to the drawings

Figure 1:
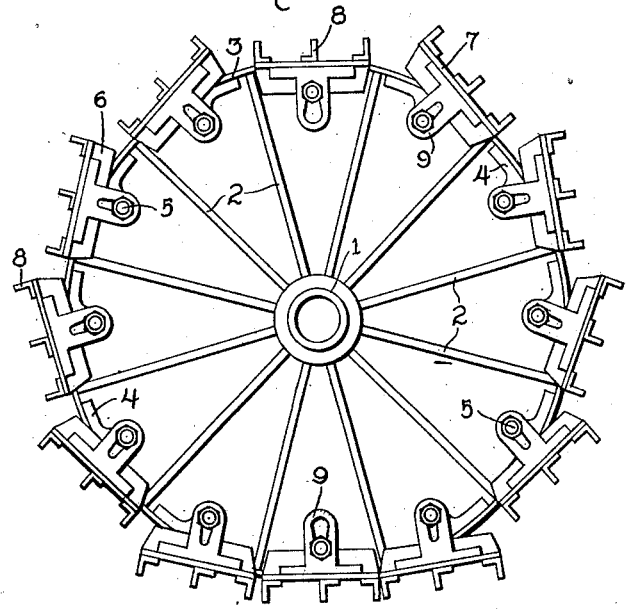
Figure 1 is a side elevation of a traction wheel equipped with my tread shoe.
Figure 2:
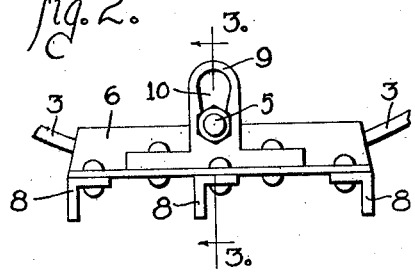
Fig. 2 is an enlarged side elevation of one of the auxiliary tread shoes.
Figure 3:
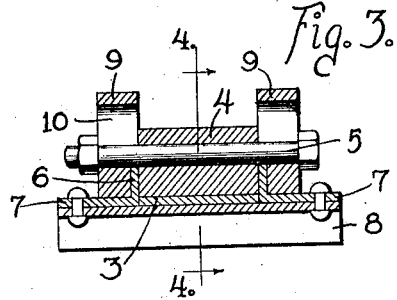
Fig. 3 is a cross-section taken transversely of Fig. 2 along line 3—3 of Fig. 2.
Figure 4:
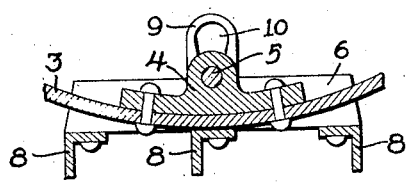
Fig. 4 is a longitudinal section of the shoe taken along line 4—4 of Fig. 3.

The wheel proper has a hub 1, spokes 2 and a rim or felly 3, the latter being shown herein as a plain iron band but it will be understood that my shoe may be applied to a variety of rims differing substantially from the one shown.

A plurality of evenly spaced bearings 4 are secured to the inner periphery of the wheel rim and each tread shoe is adapted to be pivotally mounted on a bearing 4 by means of a single bolt 5.

The tread shoe is preferably constructed of angle iron or angularly bent plates. Two of these irons have their respective vertical flanges 6 extending parallel with and adjacent the rim 3 and their respective horizontal flanges 7 extending outwardly from the rim. These form the body or sides of the shoe. Disposed transversely of the sides and secured thereto are other angle irons each having a flange 8 extending away from the flange 6 of the sides.

Secured to each of the sides is a block 9 one face of which forms an extension of that face of flange 6 which is adjacent bearing 4. Blocks 9 are slotted at 10 to receive bolt 5 and thereby to secure the shoe loosely to the rim. Slot 10 extends radially of the wheel and provides for movement of the shoe toward and from hub 1. The upper end of slot 10 is enlarged transversely to permit the shoe to move more freely upon its bearing bolt from retracted to extended position. By means of this enlargement, the shoe can so move even after one end of the shoe engages the tire by a pivoting of the shoe about the tire-engaging end and without the sliding of the shoe along the tire which would otherwise be necessary and which would be attended with some difficulty when the shoe is under pressure.

As the shoe nears the ground, one end alines with the wheel rim and comes to a temporary rest while its bolt 5 moves to the bottom of its slot 10. As the wheel continues to roll, the end of the next shoe alines with the lowermost shoe and with the wheel rim and the track continued. This results in a broad bearing surface the whole length of the auxiliary tread and the width substantially that of the rim and the two angle pieces at the sides thereof.

In going into a hollow place or down an incline the auxiliary sections will conform at once to the shape thereof, and the ribs 8 will engage the earth in such a manner as to keep the wheels from slipping. In passing through soft or sticky ground the wheel will be self-cleaning, as the shoes 7 are constantly assuming different positions with relation to the rim, thus removing any earth which has a tendency to adhere to such rim.

There has been herein shown and described the preferred embodiment of my invention, but changes can be made in the construction and arrangement of the parts thereof, without departing from the spirit of the same.

What I claim and desire to secure, is:

1. A traction shoe for attachment to the rim of a wheel and comprising a pair of parallel plates having lateral flanges, parallel transverse angle ribs spaced apart and connected to said plates on the bottom of said flanges, and means for loosely connecting the plates to the wheel rim.

2. A traction shoe for attachment to the rim of a wheel and comprising a pair of parallel upstanding plates having lateral flanges, transverse angle ribs spaced apart and connected to said plates on the under side of said flanges, blocks fastened to said plates and having openings therein, and means engaging said openings for loosely connecting the shoe to the wheel rim.

3. The combination with the rim of a wheel, of a traction shoe comprising a pair of parallel upstanding plates having outwardly projecting lateral flanges, transverse angle ribs spaced apart and connected to said plates on the under side of said flanges, blocks connected to said plates on the upper side of said flanges and having elongated openings therein, a bearing block fastened on the inner face of the wheel rim and having a bolt opening therein, and a bolt seated in said opening in the bearing block and engaging said elongated openings.

4. The combination with the rim of a wheel, of a traction shoe comprising a pair of parallel upstanding plates having outwardly projecting lateral flanges, transverse ribs spaced apart and connected to said plates on the under side of said flanges, blocks mounted on said plates on the upper side of said flanges and having elongated openings therein, the upper portion of each opening being wider than the lower portion thereof, a bearing block fastened on the inner face of the wheel rim and having a bolt opening therein, and a bolt seated in said opening in the bearing block and engaging said elongated openings.

In testimony whereof I affix my signature.

LOUIS E. SLAUSON.